(12) United States Patent
Chang et al.

(10) Patent No.: US 8,447,608 B1
(45) Date of Patent: May 21, 2013

(54) CUSTOM LANGUAGE MODELS FOR AUDIO CONTENT

(75) Inventors: Walter W. Chang, San Jose, CA (US); Michael J. Welch, Los Angeles, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1050 days.

(21) Appl. No.: 12/332,297

(22) Filed: Dec. 10, 2008

(51) Int. Cl.
*G10L 15/18* (2006.01)
*G06F 17/27* (2006.01)

(52) U.S. Cl.
USPC .............................................. 704/257; 704/9

(58) Field of Classification Search
USPC ............................................. 704/9, 231–257
See application file for complete search history.

(56) References Cited

U.S. PATENT DOCUMENTS

| | | | |
|---|---|---|---|
| 6,188,976 B1 * | 2/2001 | Ramaswamy et al. | 704/9 |
| 7,835,911 B2 * | 11/2010 | Balchandran et al. | 704/257 |
| 2001/0051868 A1 * | 12/2001 | Witschel | 704/9 |
| 2002/0123891 A1 * | 9/2002 | Epstein | 704/235 |
| 2003/0050778 A1 * | 3/2003 | Nguyen et al. | 704/235 |
| 2005/0114117 A1 * | 5/2005 | Kristjansson et al. | 704/205 |
| 2007/0100618 A1 * | 5/2007 | Lee et al. | 704/238 |
| 2007/0192308 A1 * | 8/2007 | Wei et al. | 707/5 |
| 2007/0233488 A1 * | 10/2007 | Carus et al. | 704/257 |
| 2011/0296374 A1 * | 12/2011 | Wu et al. | 717/104 |

OTHER PUBLICATIONS

Abhinav Sethy, Panayiotis G. Georgiou, Shrikanth Narayanan. "Building Topic Specific Language Models from Webdata Using Competitive Models", Proceedings of Interspeech , , Oct. 2005, 5 pages.
G.J.F. Jones, H. Lloyd-Thomas, and J.H. Wright, "Adaptive Statistical and Grammar Models of Language for Application to Speech Recognition," Grammatical Inference: Theory, Applications and Alternatives, IEE Colloquium, Apr. 1993, 8 pages.

* cited by examiner

*Primary Examiner* — Samuel G Neway
(74) *Attorney, Agent, or Firm* — Wolfe-SBMC (57) ABSTRACT

This specification describes technologies relating to generating custom language models for audio content. In some implementations, a computer-implemented method is provided that includes the actions of receiving a collection of source texts; identifying a type from a collection of types for each source text, each source text being associated with a particular type; generating, for each identified type, a type-specific language model using the source texts associated with the respective type; and storing the language models.

40 Claims, 4 Drawing Sheets

CUSTOM LANGUAGE MODELS FOR AUDIO CONTENT

BACKGROUND

The present disclosure relates to customizing language models for speech-to-text recognition.

Language models are used to model a probability that a string of words in a given vocabulary will occur. Language models are used in many natural language processing applications, including automatic speech recognition, machine translation, and information retrieval.

A speech-to-text recognition system typically digitizes an audio signal into discreet samples. Those discreet samples are generally processed to provide a frequency domain analysis representation of the original input audio signal. With the frequency domain analysis of the signal, a recognition system maps the frequency domain information into phonemes. Phonemes are the phonetic sounds that are the basic blocks used to create words in every spoken language. For example, the English written language has an alphabet of 26 letters. However, the vocabulary of English phonemes is typically a different size.

The mapping provides a string of phonemes mapped to the frequency domain analysis representation of the original input signal. Speech detection processing resolves the phonemes using a concordance or a dictionary. In the case of homonyms, for instance, the word "whale," the listener may not know whether the intended word is an ocean mammal "whale" or a cry "wail".

Speech detection systems may have concordances of multi-token strings that are called "n-grams." In an n-gram model, the probability of a last word in a string of n words is a conditional probability based on the preceding n−1 words in the string. For the homonym example above, a speech detection system can be used to determine whether it is more likely that a string of phonemes corresponds to "I saw a blue whale" or "I saw a blue wail" based on a calculated conditional probability that either "whale" or "wail" occurs with the context of "I saw a blue".

The conditional probabilities for a given string are generally determined empirically, according to relative frequencies in a collection of text. Conditional probabilities for strings within the maximum n-gram order in the n-gram language model correspond to the probability stored in the language model for the n-gram, e.g., p(whale|I saw a blue) is the conditional probability stored in the language model for the 5-gram entry "I saw a blue whale". Thus, a language model in a speech-to-text system provides a statistical likelihood that a sequence of phonemes corresponds to a given word using the context of the preceding tokens. The output from this process is a textual transcription of the original input signal.

SUMMARY

This specification describes technologies relating to generating custom language models for audio content.

In general, one aspect of the subject matter described in this specification can be embodied in computer-implemented methods that include the actions of receiving a collection of source texts; identifying a type from a collection of types for each source text, each source text being associated with a particular type; generating, for each identified type, a type-specific language model using the source texts associated with the respective type; and storing the language models. Other embodiments of this aspect include corresponding systems, apparatus, and computer program products.

These and other embodiments can optionally include one or more of the following features. The method further includes processing one or more source texts to extract particular content portions. The method further includes one or more source texts being structured documents and processing the documents includes removing tags indicating document structure. The method further includes one or more source texts being in XML format. The method further includes each source text including an identifier of the particular type associated with the source text.

The method further includes receiving an audio source file; using one or more of the language models to generate a text file from the audio source file using speech-to-processing; and storing the text file. The method further includes filtering the received audio source file to remove noise prior to using the one or more language models. The method further includes receiving an input identifying a type of the collection of types associated with the audio source file; and selecting one or more language models according to the received input. The method further includes using the one or more language models according to the received input. The method further includes combining one or more of the generated one or more language models with a default language model generated using a second collection of text.

The method further includes evaluating the generated one or more language models based on a word error rate. The method further includes adjusting the generated one or more language models based on the evaluation of the generated one or more language models; and storing the adjusted one or more language models. The method further includes the particular type being based at least in part on a genre of one of a group of cinematic, television, musical, or literary compositions. The method further includes training the type-specific language model using the particular source texts of the type.

In general, one aspect of the subject matter described in this specification can be embodied in methods performed by a computer programmed to provide one or more language models that include the actions of receiving a collection of source texts; identifying a type from a collection of types for each source text, each source text being associated with a particular type; generating, for each identified type, a type-specific language model using the source texts associated with the respective type; and storing the language models.

Particular embodiments of the subject matter described in this specification can be implemented to realize one or more of the following advantages. The system enhances speech-to-text transcription to provide highly accurate transcripts of source audio. Generating custom language models according to source text type allows for highly accurate speech-to-text transcription of input texts belonging to a particular type. Additionally, the speech-to-text transcription of specialized input texts can be improved relative to speech-to-text transcription system using generic language models. Thus, text information can be provided for various industries using particular types of source texts, e.g., filmmaking, where a script supervisor preserves story continuity using the dialogue filmed and actions occurring throughout the film.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
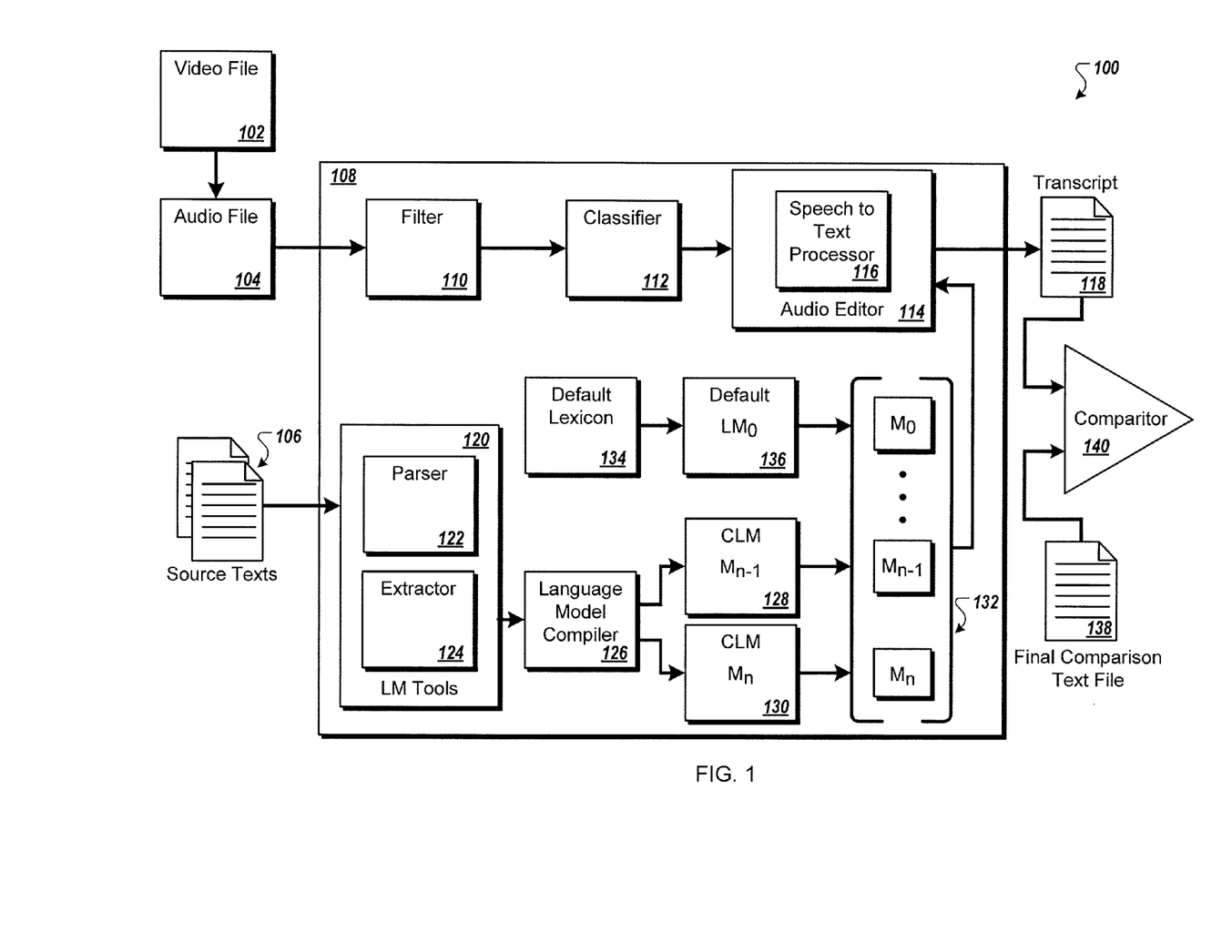
FIG. 1 is a diagram representing an example system for performing speech-to-text recognition using one or more customized language models.

FIG. 1 is a diagram 100 representing an example system for performing speech-to-text recognition using one or more customized language models. The diagram 100 includes modules for extracting sentences from identified text source files, grouping the sentences into a form for processing, running one or more language model construction tools to build language models, and evaluating the performance of each language model or a subset of the language models. In particular, the diagram 100 includes a video file 102 having an audio file 104 and source texts 106 and a custom language processor 108. The video file 102 can be, for example, a movie or a television show, where the audio file 104 is the corresponding audio portion of the video file 102.

The custom language processor 108 includes a filter 110, a classifier 112, and an audio editor 114. The filter 110 receives the audio file 104. In some implementations, the filter 110 performs digital signal processing on the audio file 104. For example, the audio file 104 may include noise from traffic passing a movie location. The desired sounds on the audio file 104 are more likely to be the dialogue between the actors in the example. The filter 110 can process the audio file 104, for example, using high and low pass filters, as well as center channel filters, to remove out of band noise so that the classifier 112 can more easily identify a type associated with the audio file 104.

The audio editor 114 receives the audio file 104 with the identified type. In some implementations, the type is a genre, e.g., a genre for a movie, television show, literature, or music. Genres include characterizations of art using a particular style, form, or content. For example, television genres include sit-coms, reality television, dramas, soap operas, talk shows, and news broadcasts. The audio editor 114 can include a speech-to-text processor 116. Using one or more language models, the speech-to-text processor 116 can process the audio file 104. For example, the speech-to-text processor 116 can guide speech word and phrase detection (e.g., using one or more language models) and output a text file that contains words, their starting offsets, duration, and confidence information. The audio editor 114 can generate a transcript 118 of the audio file 104 from the data from the speech-to-text processing 116. The transcript 118 can include text, their starting offsets, duration, and confidence information.

The custom language processor 108 also includes language model tools 120 with a parser 122 and an extractor 124 and a language model compiler 126. The custom language processor 108 receives the source texts 106 and transmits them to the language model tools 120. The language model tools 120 can determine a lexicon from the source texts 106. The lexicon for the source texts 106 can include each distinct word and expressions contained within the source texts 106. In some implementations, the parser 122 pre-processes the source texts 106 for the extractor 124 to extract portions of text for a lexicon of a custom language model. The extracted portions of text can be transmitted to the language model compiler 126 to generate the custom language model. The custom language model can include a list of unique tokens with their frequency to provide statistics as to n-gram probabilities that a string exists. For example, the custom language model can include n-gram probabilities from training data. The system can receive training data from another source or generate training data using default data. The system can also generate training data using sources with the same or a similar type.

As shown in FIG. 1, the system 100 includes two custom language models (128, 130). However, in some other implementations, the system 100 includes one or more custom language models. The custom language models 128 and 130 are generated using source texts 106. The source texts 106 can include one or more collection of texts (e.g., one or more collections of source documents). Each collection can correspond to a particular type of texts, which can then be used as training data for a custom language model of that type. Alternatively, the system 100 can generate a single custom language model for the source texts 106.

The system 100 can generate a custom language model for particular types. For example, the system 100 can generate a custom language model for action movies with certain words (e.g., "world", "evil", and "apocalypse") having greater probabilities than those same words in a custom language model for a comedy. Weights and coefficients 132 are applied to each of the custom language models (128, 130). The system can determine the influence of the weights and coefficients 132 for the language model based on testing the efficacy of particular combinations of weights and coefficients 132 in speech-to-text processing, as described further below. In some implementations, different weights and coefficients are applied to each custom language model or combinations of language models. The set of weights and coefficients can be stored, for example, in a matrix of language models and corresponding weights and coefficients. For example, each language model can include various parameters to which particular weight values can be applied. The weights that provide a specified accuracy in speech-to-text transcription can vary for each language model as well as for particular combinations of language models.

A default lexicon 134 is also shown in FIG. 1 as being used to generate a default language model 136. The default lexicon 134 can be derived from a training set of texts that are not type-specific. This is used to train a language model 136 that is generic for use with a wide variety of input texts.

In some implementations, the default lexicon 134 includes lexicons for one or more languages, e.g., English, Japanese, or Spanish. Likewise, the default lexicon 134 can be derived from a collection of text including, for example, news texts, scripts, blogs, or other documents. For example, if the language models being generated are for a news broadcasting outlet, e.g., National Public Radio, a default lexicon 134 can be built specific to that station that includes general content form the station. Using the default language model 136 along with a custom language model (130, 132) can reflect the interviewer's lexicon along with the specifics of a particular visitor to a show.

The system 100 applies the set of weights and coefficients 132 to the default language model 136. The result of the application of the weights and coefficients 132 are transmitted to the audio editor 114 and used to assist in processing the audio file 104.

Once the transcript 118 is generated, the system transmits the transcript 118 and a final comparison text file 138 to a comparator 140. The comparator 140 can determine the efficacy of the custom language processor 108. For example, the system 100 can perform cross validation on two sets of data, each using a matched pair of an audio file and a final comparison text file to evaluate the performance of the custom language models (128, 130).

In some alternative implementations, the comparator 140 compares a transcribed speech input with a known corresponding text at run-time. For example, a script supervisor can determine variances in filming from an original script or shooting script, e.g. actor improvisation. For example, an actor may choose to vary a line in a scene for several different takes. Depending on the take that the production staff chooses, the character or story itself can change.

As part of determining the efficacy of the weights and coefficients 132 applied to the custom language models (128, 130) and the default language model 136, the system can compute 100 recall and precision metrics for a pair of transcripts. The recall and precision metrics can be similar to Word Error Rate (WER) and Word Recognition Rate (WRR). For example, the pair of transcripts can include one transcript generated using the custom language models (128, 130) and one transcript generated without using the custom language models (128, 130) (e.g., using only the default language model 136) to determine whether the custom language models (128, 130) improve accuracy when used in conjunction with the default language model 136. In some implementations, the system 100 adjusts the weights and coefficients 132 until a local maximum in precision and recall scores is reached for a given test file.

In some implementations, the source texts 106 each include an identifier of the particular type associated with the source text. The source texts 106 can have such identifiers as "Action/Adventure," where the source texts 106 include extracted dialogue portions of sample movie scripts. Likewise, the source texts 106 can be "Documentary/Travel" show transcripts with narrative and dialogue extracted. Similarly, the source texts 106 can be "Conversational", or collections of blogging text posts with commentary. The source texts 106 can be manually annotated prior to transmission to the custom language processor 108. Alternatively, the custom language processor 108 can identify the source texts 106 from a database of terms stored, e.g., "indigenous" and "rainforest" in one source text can be identified as "Documentary/Travel" while "explosion" and "mass hysteria" can be identified as "Action/Adventure".

In some implementations, the system 100 processes the source texts 106 to extract particular content portions. For example, the source texts 106 can be structured documents and the system 100 can remove tags indicating document structure. In some implementations, the source texts 106 are in XML format. For example, the source texts 106 may be movie scripts with dialogue and scene direction all formatted for the industry such that the dialogue can be separated from the other script elements.

Some movies have a specialized lexicon for a script. The movie "Aliens" has vocabulary and nomenclature specific to that movie. For example, the following dialogue occurs in the movie:

Hudson: Is this gonna be a standup fight, sir, or another bughunt?

Gorman: All we know is that there's still no contact with the colony, and that a xenomorph may be involved.

Frost: Excuse me sir, a-a what?

Gorman: A xenomorph.

Hicks: It's a bughunt.

The terms "xenomorph" and "bughunt" are not found in Merriam-Webster's Online Dictionary (Dictionary and Thesaurus—Merriam-Webster Online, http://www.merriam-webster.com). The default language model 134 based on the English language may provide the speech-to-text processor 116 with the terms "bug" and "hunt" separately. If either of the words in the audio file 104 are disambiguated in the audio editor 114, the likelihood that "bug" and "hunt" are chosen for the same string in a typical dictionary can be less likely without the one or more custom language models (128, 130). Prior to the movie "Aliens", "xenomorph" was used most often as a term for geology, i.e., a mineral without an external crystal form from late crystallization between earlier formed crystals. Given the context of the script and the likelihood that "xenomorph" might not be included in a default language model, a custom language model can increase the likelihood that the correct speech-to-text transcription is generated.

In some implementations, the data in the script is compared against the movie to perform a "time alignment". For example, if the script has several portions of dialogue where one of the characters talks about being in some particular room with a table, descriptive information in the scene may recite that a particular set matching the dialogue. Using time alignment, the system may be able to determine various points in the movie where the table is mentioned. With time code information used to synchronize the script to the movie, a user can determine when in the movie we can find those objects.

Likewise, in some implementations, a live news room typically has no script. The data transmitted to the audio editor 114 may only be the audio file 104. If the audio editor 114 is provided the one or more language models 132 based on a literary composition, e.g., blog, website, e-mail, or data from an advertisement for the news segment, the transcript 118 of the news segment has a higher probability of accuracy, particularly with non-English dictionary terms, e.g., individual names, corporate names, and locations.

Figure 2:
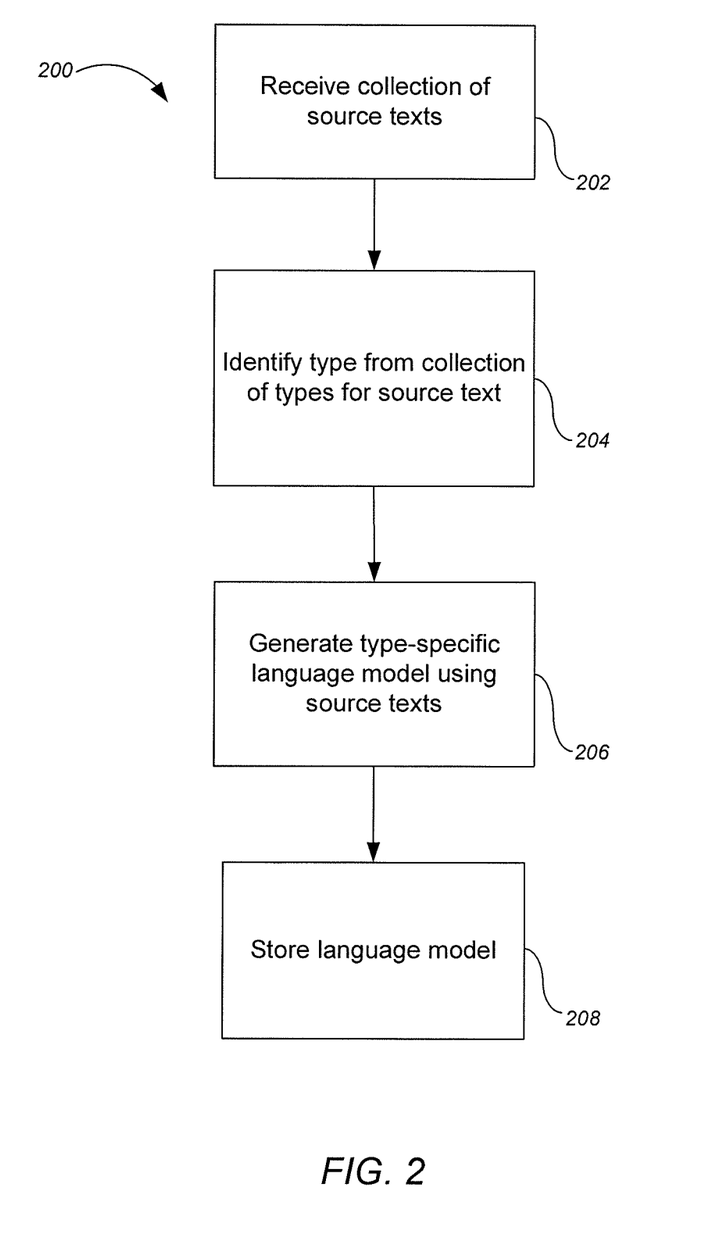
FIG. 2 is a flow chart of an example method for generating customizing language models.

FIG. 2 is a flow chart of an example method 200 for generating custom language models. For convenience, the method 200 will be described with respect to a system that will perform the method 200.

The system receives 202 a collection of source texts. In some implementations, the source texts can be from a variety of sources, including movie scripts, television scripts, novels, news feeds, web sites, blogs, and lyrics. The system can receive all source texts from a single database. Similarly, the system can receive the source texts for an individual use of the system. In some implementations, the system converts the source text, e.g., a script text into an XML format that is then parsed. The script's dialogue can be the only portion of the source document that provides data for the language model. For example, some scripts have non-dialogue textual information including header, information, scene information, head-up, or the actions in the scene, and camera transition. The system can pre-process and format the source text so that that dialogue information is extracted and distilled.

For example, for the following script excerpt:

//

INT. ELEVATOR—02:15

John reaches up to the elevator's ceiling, pulls down the light panel to reveal a trap door. As John starts to push it open . . . .

. . . a hand yanks it free from above. It's Ted.

Ted: I'm not going to sit this one out.

//

In the above example, the only dialogue from the script is the single line from Ted. The script is processed to filter out the non-dialogue portions such that the source text for the language model is just the dialogue portion: "I'm not going to sit this one out." This prevents the non-dialogue text from reducing the accuracy of the language model with respect to particular types.

The system identifies 204 a type from a collection of types for each source text. Each source text can be associated with a particular type. For example, the particular type can be based at least in part on a genre of one of a group of cinematic, television, musical, or literary compositions. In some implementations, the group includes comedy, horror, action, science fiction, and family movies. In some implementations, the source text is associated with more than one particular type. For example, the movie "Aliens" can be associated with genres including "science fiction", "action", "futuristic", "feminism", and "war".

In some implementations, each source text includes a tag identifying the type (e.g., from a prior classification process whether it be manual annotation or automatic). Alternatively, the source text can be associated to a folder for a particular type. In some implementations, the system has a user interface with an indicator for a potential genre or sub-genre. The system can automatically select and configure a set of appropriate language models for processing based on the identified genre or sub-genre.

The system generates 206, for each identified type, a type-specific language model using the source texts associated with the respective type. For example, a particular collection of source texts can belong to a particular type. The source texts in this collection can be processed to build a type specific lexicon that identifies the frequency of vocabulary terms within the collection. The likelihood of terms occurring the terms from the collection of types specific source texts can then be used to train a custom language mode (e.g., an n-gram language model) for that type. Consequently, the probability for particular n-gram strings can vary between custom language models based on the composition of the source texts used to generate each respective language model. Additionally, each language model can be smoothed to estimate probabilities for unseen strings.

In some implementations, the type-specific language model includes words from more than one language, such as Spanish and English. For example, if the audio file has both Spanish and English dialogue, the system may require both Spanish and English source texts to create the type-specific language model. In some implementations, the source texts contain words that are not known to any language prior to their creation in the source text, e.g., "embiggen" from "The Simpsons" television show. Likewise, words may change their meaning entirely, as discussed in the example of "xenomorph" transitioning from a geological term to a science fiction reference.

The system stores 208 the language model for each type. In some implementations, more than one language model can be stored in a single location. For example, the system may store the language models in a database for processing. Alternatively, the various language models can be distributed among different locations. Likewise, the system can store the language model locally on a user device. In some implementations, the system evaluates the language models. For example, the system can evaluate the language models based on a word error rate or other evaluation metric. The system can also adjust the language models based on the evaluation of the language models and store the adjusted language models.

Figure 3:
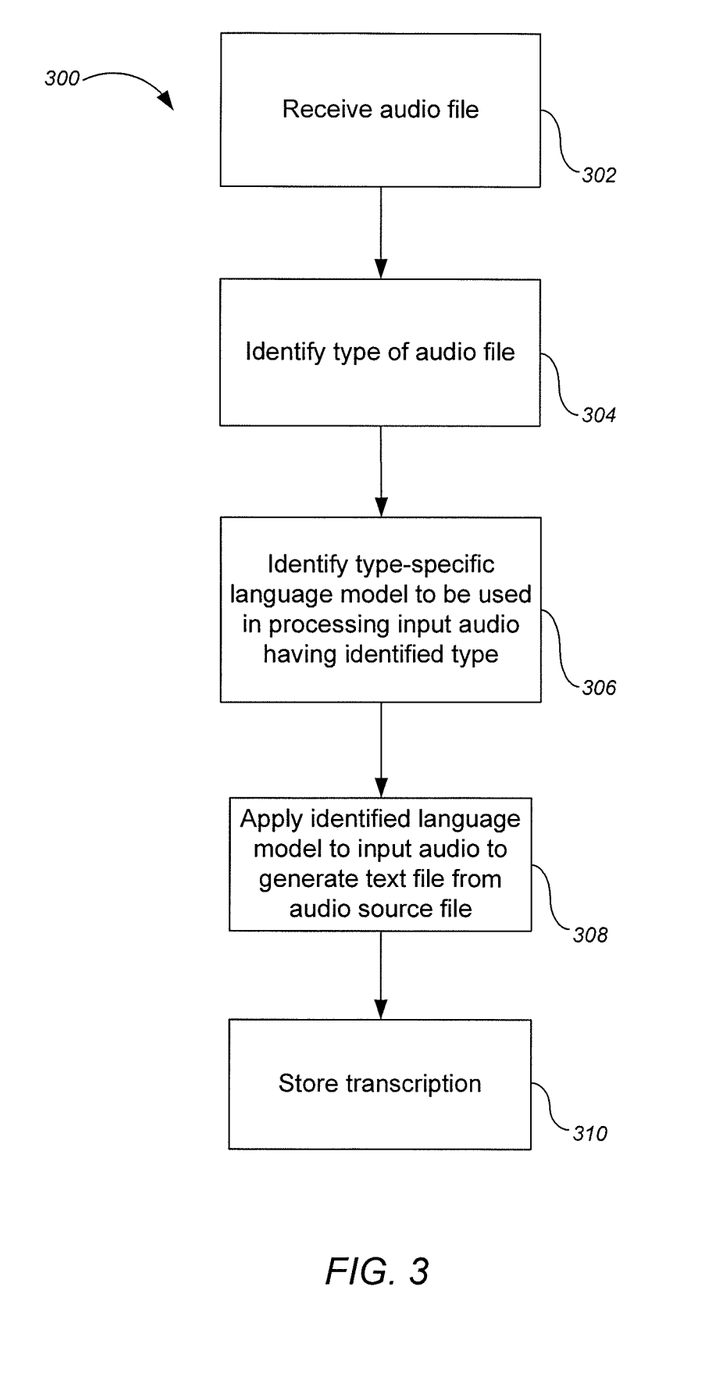
FIG. 3 is a flow chart of an example method for using customizing language models for speech-to-text recognition.

FIG. 3 is a flow, chart of an example method 300 for using customizing language models for speech-to-text recognition. For convenience, the method 300 will be described with respect to a system that will perform the method 300.

The system receives 302 an audio file. The system can receive the audio file from a video file, e.g., the sound file from a movie or television show. Alternatively, the audio may be received separately from a video file. For example, during the filming of a movie, the audio file can be recorded separately with an embedded time code so that the system can resynchronize the production audio. In another example, the audio file may not be associated with a video file, e.g., a radio program, a speech, or a dictation file.

In some implementations, the system filters the received audio file to remove noise prior to using the one or more language models. The filters can include low and high pass filters. Likewise, a bandpass filter can be implemented to improve the system's ability to determine spoken or sung words in the audio file.

The system identifies 304 a type of audio file. In some implementations, the system receives an input identifying a type, from the collection of types, associated with the audio source file. For example, a user input can identify the type of the audio file. Alternatively, the type can be encoded with the audio file (e.g., as associated metadata). Alternatively, the system can use a source text that is the source script to the movie or a novel that is the inspiration for the script. In situations where a news journalist is interviewing an individual who has been interviewed or has written information regarding the topic at hand, previous transcribed interviews and literary compositions (e.g., e-mails, blogs, web sites, and essays) can be used as source files.

In some implementations, the input reflects a particular genre. For example, movie genres range in a hierarchy to categorize different types of films. The system can receive an input after a user is provided a listing of various genres and subgenres. For example, the user can select "Fictional", then "Animation", then "Computer-animated." The movie genres can also be categorized by different points of categorization, e.g., mood, theme, setting, and format. For example, the user can input a desired mood of "Action/Adventure" with a sub-mood of "Action", a theme of "Science Fiction", a setting of "Futuristic", and a format of "Live Action". These inputs can be provided through the user's selection or metadata within the audio file.

The system identifies 306 one or more type-specific language models to be used in processing input audio having the identified type. In some implementations, the system includes several pre-generated custom language models, each associated with a particular type. For example, the system can use the input regarding the audio file type and choose one or more custom language models that is associated with the same type as the audio file. For example, training the system for particular custom language models, as described above with respect to FIG. 2, can identify particular weighted combinations of custom language models and a default language model for processing types of audio input. Similarly, the input may comprise more than one type, and the system can choose custom language models for each type associated. The system can also choose a language model that represents at least some of the types input.

In some implementations, the system provides the user with various type specific custom language models to select for use in speech-to-text processing. For example, the system can provide a list of custom language models that are associated with one or more types from the input. The system can also provide a list of custom language models associated with one or more types similar to the input. For example, the input can be "action/adventure", and the list can include a custom language dictionary that has the type "science fiction". Likewise, the system can provide the user with a complete set of all custom language models to choose. The user can choose one or more of the custom language models. In some implementations, the system provides the user with a database of source texts to choose to generate a custom language dictionary using the chosen source texts.

The system can also receive input from the user to enhance the custom language models, e.g., terms from the audio file that may not be available to pre-generated custom language models. For example, the user can provide the terms "xenomorph" and "bughunt" to add to the custom language models. Likewise, the user can modify existing weights and coefficients for particular terms. For example, the user can increase the weight for the term "colony".

The system applies the identified one or more language models to the input audio to generates 308 a text file from the audio source file using speech-to-text processing using one or more of the language models. In some implementations, the system uses a weighted combination of the one or more language models. For example, if the audio file is that of a sequel, the language models can be based from a source text of the previous movie's script and the current movie's source script. Weighting the language models can depend on variables specific to the movie. For example, the weighting may depend on how far into production and how heavy the changes have been made from the first movie to the second.

The system stores 310 the text file. In some implementations, the text file is used as a source file to improve the efficacy of the system. The system can change the weighting and coefficients for the language model depending on the accuracy of the text file as compared to a comparison text file. In some implementations, the text file is added to a database of source texts. For example, the text file can be used to create a new language model for the next audio file transmitted to the system for the same movie from a different day of shooting.

Alternatively, the text file can be stored or transmitted for use by one or more users. For example, a user can use the text file to determine variances in a speech. For example, an attorney practicing a closing statement can see which points are missing from a practice delivery and arguments that have not been perfected.

Figure 4:
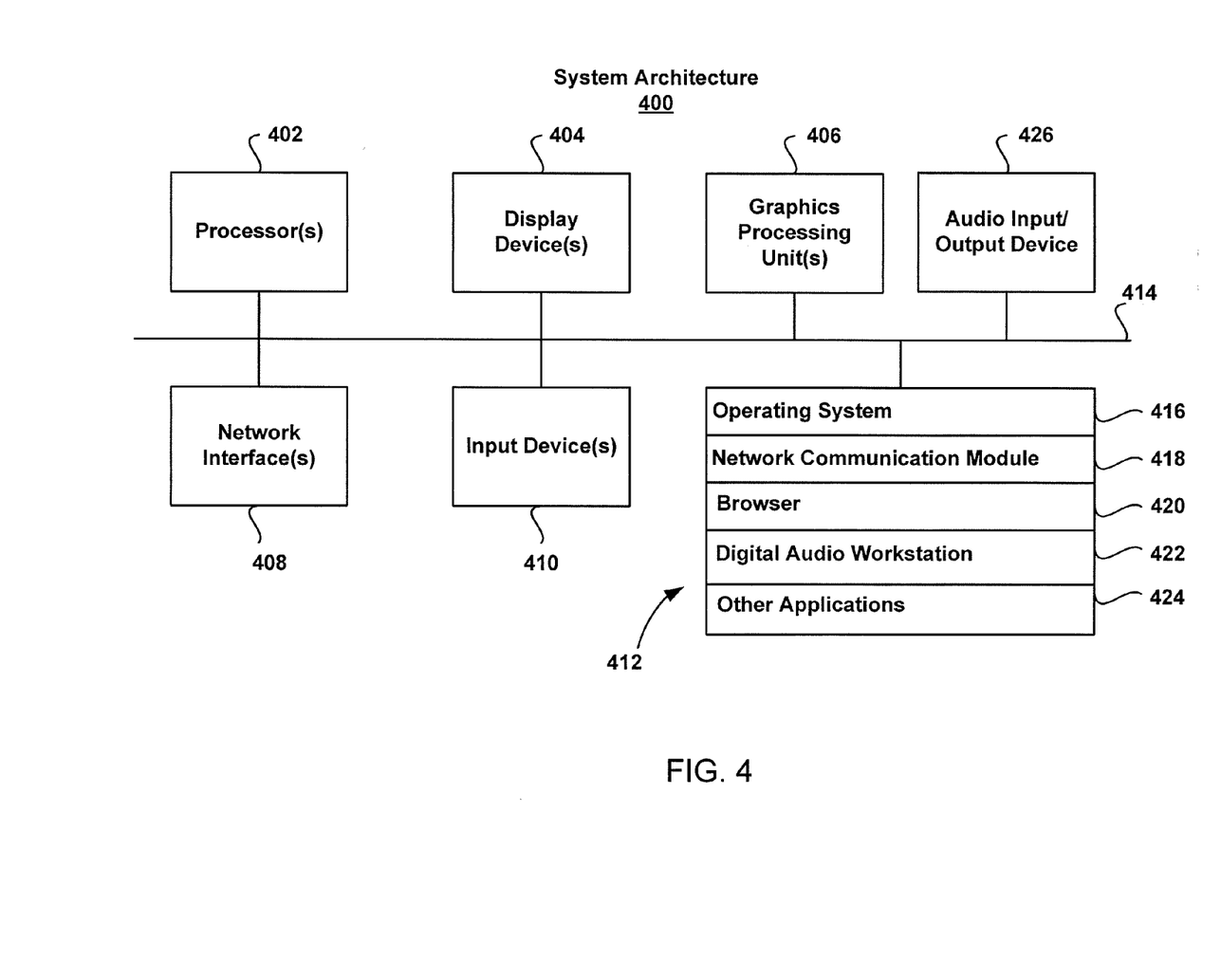
FIG. 4 is a block diagram of an example user system architecture.

FIG. 4 is a block diagram of an exemplary user system architecture 400. The system architecture 400 is capable of hosting an audio processing application that can electronically receive, display, and edit one or more audio signals. The architecture 400 includes one or more processors 402 (e.g., IBM PowerPC, Intel Pentium 4, etc.), one or more display devices 1404 (e.g., CRT, LCD), graphics processing units 406 (e.g., NVIDIA GeForce, etc.), a network interface 408 (e.g., Ethernet, FireWire, USB, etc.), input devices 410 (e.g., keyboard, mouse, etc.), and one or more computer-readable mediums 412. These components exchange communications and data using one or more buses 414 (e.g., EISA, PCI, PCI Express, etc.).

The term "computer-readable medium" refers to any medium that participates in providing instructions to a processor 402 for execution. The computer-readable medium 412 further includes an operating system 416 (e.g., Mac OS®, Windows®, Linux, etc.), a network communication module 418, a browser 420 (e.g., Safari®, Microsoft® Internet Explorer, Netscape®, etc.), a digital audio workstation 422, and other applications 424.

The operating system 416 can be multi-user, multiprocessing, multitasking, multithreading, real-time and the like. The operating system 416 performs basic tasks, including but not limited to: recognizing input from input devices 410; sending output to display devices 404; keeping track of files and directories on computer-readable mediums 412 (e.g., memory or a storage device); controlling peripheral devices (e.g., disk drives, printers, etc.); and managing traffic on the one or more buses 414. The network communications module 418 includes various components for establishing and maintaining network connections (e.g., software for implementing communication protocols, such as TCP/IP, HTTP, Ethernet, etc.). The browser 420 enables the user to search a network (e.g., Internet) for information (e.g., digital media items).

The digital audio workstation 422 provides various software components for customizing language models for speech-to-text recognition, as described with respect to FIGS. 1-3 including receiving an audio file, receiving source texts, identifying a type of the audio file, using the type to determine the source files to use in generating a language model, and generating a transcript using the audio file and the language model. The digital audio workstation can receive inputs and provide outputs through an audio input/output device 626.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any foam, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
receiving a collection of source texts;
identifying a type from a collection of types for each source text, each source text being associated with a particular type;
generating, by data processing apparatus, a type-specific language model for each identified type using the source texts associated with the respective type;
storing the language models in a computer-readable medium;
receiving an audio source file to be processed, the audio source file having a particular type;
selecting a particular weighted combination of the language models, wherein weighting the particular weighted combination of the language models depends on the type of the audio source file to be processed; and
generating, by data processing apparatus, a text file from the audio source file based on the selected weighted combination of language models.

2. The method of claim 1, further comprising:
processing one or more source texts to extract particular content portions.

3. The method of claim 2, where the one or more source texts are structured documents and the processing includes removing tags indicating document structure.

4. The method of claim 3, where the one or more source texts are in XML format.

5. The method of claim 1, where each source text includes an identifier of the particular type associated with the source text.

6. The method of claim 1, further comprising:
using the weighted combination of language models to generate the text file from the audio source file using speech-to-text processing; and
storing the text file.

7. The method of claim 6, further comprising:
filtering the received audio source file to remove noise prior to generating the text file.

8. The method of claim 6, further comprising:
receiving an input identifying a type of the collection of types associated with the audio source file; and
selecting the weighted combination of language models according to the received input.

9. The method of claim 6, wherein the weighted combination of language models includes a default language model generated using a second collection of text.

10. The method of claim 1, further comprising:
evaluating the generated language models based on a word error rate.

11. The method of claim 10, further comprising:
adjusting the generated language models based on the evaluation of the generated language models; and
storing the adjusted language models.

12. The method of claim 1, where the particular type is based at least in part on a genre of one of a group of cinematic, television, musical, or literary compositions.

13. The method of claim 1, where generating each type-specific language model includes training the type-specific language model using the particular source texts of the type.

14. A computer program product, encoded on a non-transitory computer-readable medium, operable to cause data processing apparatus to perform operations comprising:
receiving a collection of source texts;
identifying a type from a collection of types for each source text, each source text being associated with a particular type;
generating, for each identified type, a type-specific language model using the source texts associated with the respective type;
storing the language models;
receiving an audio source file to be processed, the audio source file having a particular type;
selecting a particular weighted combination of the language models, wherein weighting the particular weighted combination of the language models depends on the type of the audio source file to be processed; and
generating a text file from the audio source file based on the selected weighted combination of language models.

15. The computer program product of claim 14, further operable to perform operations comprising:
processing one or more source texts to extract particular content portions.

16. The computer program product of claim 15, where the one or more source texts are structured documents and the processing includes removing tags indicating document structure.

17. The computer program product of claim 16, where the one or more source texts are in XML format.

18. The computer program product of claim 14, where each source text includes an identifier of the particular type associated with the source text.

19. The computer program product of claim 14, further operable to perform operations comprising:
using the weighted combination of language models to generate the text file from the audio source file using speech-to-text processing; and
storing the text file.

20. The computer program product of claim 19, further operable to perform operations comprising:
filtering the received audio source file to remove noise prior to generating the text file.

21. The computer program product of claim 19, further operable to perform operations comprising:
receiving an input identifying a type of the collection of types associated with the audio source file; and
selecting the weighted combination of language models according to the received input.

22. The computer program product of claim 19, wherein the weighted combination of language models includes a default language model generated using a second collection of text.

23. The computer program product of claim 14, further operable to perform operations comprising:
evaluating the generated language models based on a word error rate.

24. The computer program product of claim 23, further operable to perform operations comprising:
adjusting the generated language models based on the evaluation of the generated language models; and
storing the adjusted language models.

25. The computer program product of claim 14, where the particular type is based at least in part on a genre of one of a group of cinematic, television, musical, or literary compositions.

26. The computer program product of claim 14, where generating each type-specific language model includes training the type-specific language model using the particular source texts of the type.

27. A system comprising:
a processor and a memory operable to perform operations including:
receiving a collection of source texts;
identifying a type from a collection of types for each source text, each source text being associated with a particular type;
generating, for each identified type, a type-specific language model using the source texts associated with the respective type;
storing the language models;
receiving an audio source file to be processed, the audio source file having a particular type;
selecting a particular weighted combination of the language models, wherein weighting the particular weighted combination of the language models depends on the type of the audio source file to be processed; and
generating a text file from the audio source file based on the selected weighted combination of language models.

28. The system of claim 27, further operable to perform operations comprising:
processing one or more source texts to extract particular content portions.

29. The system of claim 28, where the one or more source texts are structured documents and the processing includes removing tags indicating document structure.

30. The system of claim 29, where the one or more source texts are in XML format.

31. The system of claim 27, where each source text includes an identifier of the particular type associated with the source text.

32. The system of claim 27, further operable to perform operations comprising:
using the weighted combination of language models to generate the text file from the audio source file using speech-to-text processing; and
storing the text file.

33. The system of claim 32, further operable to perform operations comprising:
filtering the received audio source file to remove noise prior to generating the text file.

34. The system of claim 32, further operable to perform operations comprising:
- receiving an input identifying a type of the collection of types associated with the audio source file; and
- selecting the weighted combination of language models according to the received input.

35. The system of claim 32, wherein the weighted combination of language models includes a default language model generated using a second collection of text.

36. The system of claim 27, further operable to perform operations comprising:
- evaluating the generated language models based on a word error rate.

37. The system of claim 36, further operable to perform operations comprising:
- adjusting the generated language models based on the evaluation of the generated language models; and
- storing the adjusted language models.

38. The system of claim 27, where the particular type is based at least in part on a genre of one of a group of cinematic, television, musical, or literary compositions.

39. The system of claim 27, where generating each type-specific language model includes training the type-specific language model using the particular source texts of the type.

40. A method performed by a computer programmed to provide one or more language models, the method comprising:
- receiving a collection of source texts;
- identifying a type from a collection of types for each source text, each source text being associated with a particular type;
- generating, by the computer, a type-specific language model for each identified type using the source texts associated with the respective type;
- storing the language models at the computer;
- receiving an audio source file to be processed, the audio source file having a particular type;
- selecting a weighted combination of the language models, wherein the weights are determined based on the type of the audio source file to be processed; and
- generating, by the computer, a text file from the audio source file based on the selected weighted combination of language models.

* * * * *